H. KALER.
GRAIN DOOR.
APPLICATION FILED JUNE 15, 1920.

1,357,326.

Patented Nov. 2, 1920.
2 SHEETS—SHEET 2.

Witness

Inventor
HENRY KALER.
By C. A. Snow & Co.
Attorneys

UNITED STATES PATENT OFFICE.

HENRY KALER, OF RANTOUL, ILLINOIS.

GRAIN-DOOR.

1,357,326.  Specification of Letters Patent.  Patented Nov. 2, 1920.

Application filed June 15, 1920. Serial No. 389,208.

*To all whom it may concern:*

Be it known that I, HENRY KALER, a citizen of the United States, residing at Rantoul, in the county of Champaign and State of Illinois, have invented a new and useful Grain-Door, of which the following is a specification.

The present invention relates to grain car door constructions, and more particularly to grain car doors of the vertically movable type.

The primary object of the invention is to provide a door of this character which may be operated and controlled from a point exteriorly of the car to facilitate the unloading operation.

A further object of the invention is the provision of a door of the vertically sliding type which may be moved to various positions to permit the discharge of material therefrom, together with means for maintaining the door in such positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
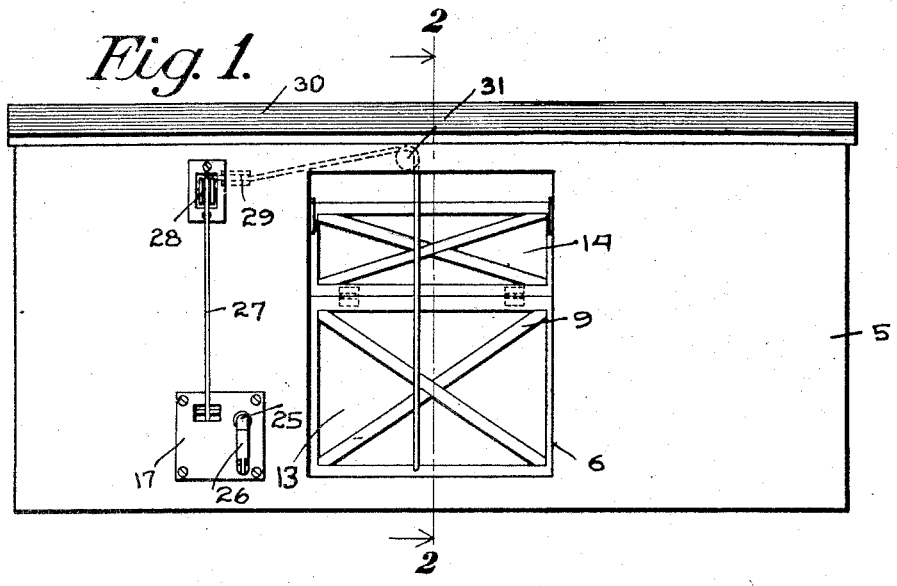
Figure 1 illustrates a side elevational view of a car showing the door constructed in accordance with the present invention as applied thereto.

Referring to the drawings in detail, the car is indicated generally by the reference character 5, which is provided with the usual door opening 6 that is closed by the vertically slidable door 9.

Within the car 5, and adjacent to the door opening 6, are the opposed track sections 8 which are disposed in spaced relation with each other to support the door 9, the track sections being formed with flanges 10 to accommodate the rollers 11 supported on the ends of the door section 13.

Figure 2:
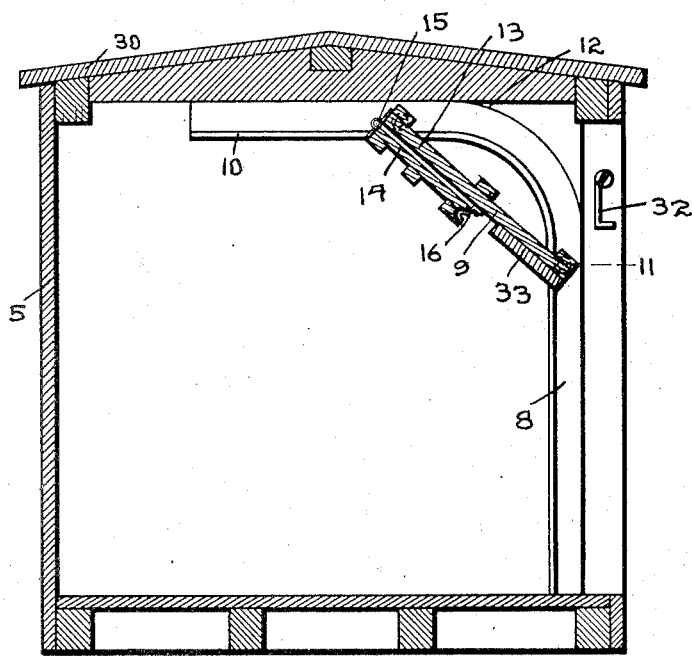
Fig. 2 illustrates a vertical sectional view taken on line 2—2 of Fig. 1.
Figure 3:
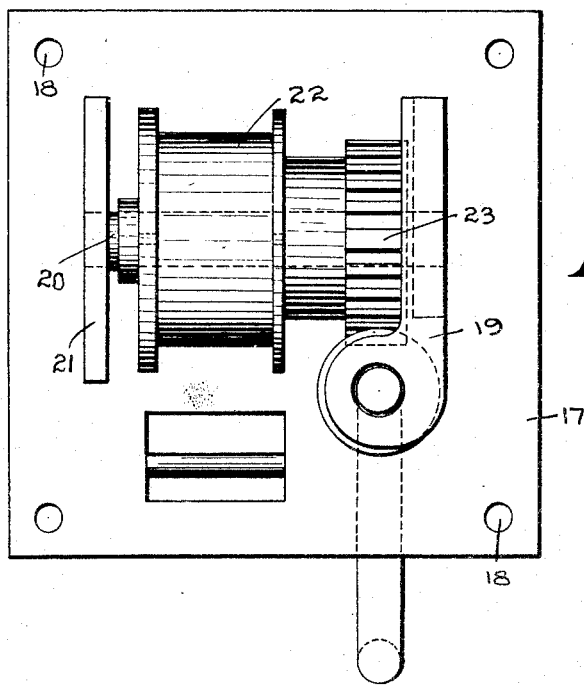
Fig. 3 illustrates a rear elevational view of the plate and operating means carried thereby.
Figure 4:
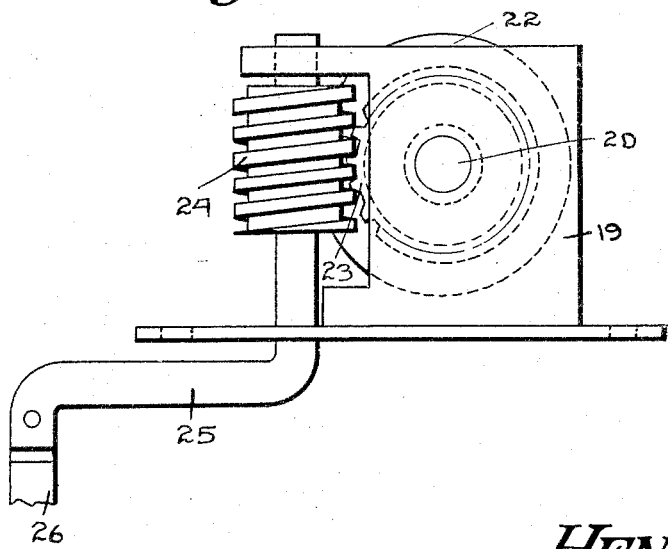
Fig. 4 illustrates an end elevational view of the same.

The upper end of each track section is curved rearwardly as at 12, and lies in a horizontal plane in parallel relation with the beams of the bar frame, thus providing a horizontal track section adapted to support the door out of operation at the limit of its upward movement. As shown, this door 9, is of a particular construction, and includes the central or body section 13, and the upper section 14, which is hingedly connected to the door 13 adjacent to the upper end thereof, as at 15, the upper section being of a width slightly less than the distance between the track sections, so that the upper section may fall downwardly between the track sections, when the door has been moved to a predetermined position, or a position as indicated by Fig. 2 of the drawings.

A latch member indicated at 16, is provided on the door section 13, and is adapted to grasp the section 14, when the same hinges downwardly, and thus automatically secure the section in its folded position.

Associated with the door 9, is an operating mechanism which includes a supporting plate 17, provided at its respective corners with openings 18 adapted to receive suitable securing means, for securing the plate in position on the car, the plate being however, positioned over an opening formed in one of the walls of the car so that the mechanism carried thereby, may be disposed interiorly of the door.

Secured to the supporting plate 17, is a bracket 19 that is apertured to provide a bearing for the shaft 20, the opposite end of the shaft being supported in the bearing 21, which is also carried by the supporting plate 17.

This shaft 20, supports the pulley 22 adjacent to one end thereof, while the pinion 23, is supported at the opposite end thereof and has communication with the worm 24, in a manner to receive rotary movement therefrom. As shown, the worm is carried on one end of the crank arm 25 that is also supported by the plate 17, the operating handle 26 extending exteriorly of the car, in a location to be easily operated by an attendant.

The operating means also includes a flexible member indicated at 27, that has connection with the drum 22 in any suitable manner, from where the same passes over the pulleys 28 and 29 arranged above the plate 17 and adjacent to the roof 30 of the car. The flexible member 27 also passes over the pulley 31, which is disposed directly above the door opening 6, and has its lower end secured to the lower end of the door or closure 9 so that the lift of the door will be directed from the bottom thereof.

From the foregoing it will be obvious that a free circulation of air is permitted through the car proper, which is accomplished with due consideration to maintaining the contents of the car free of moisture.

In order that the upper section 14 of the closure, may be supported in an upright position, hook members 32 are provided, the same being secured to the sides of the door opening, as indicated by Fig. 2 of the drawings, so that the same may be hooked over the upper edge of the section 14 and secure the same against movement. Disposed at the lower extremity of the door section 13, is a suitable weight indicated at 33, which weight is designed to return the door 9 to its normal or closed position, when the pulley 22 is operated to slacken the flexible member 27.

What I claim is:—

1. In combination with a grain car having an opening and having trackways disposed within the car adjacent to the opening, a closure for closing the opening, said closure including a body portion and a hinged upper section, said hinged upper section being of a width shorter than the distance between the trackways, said hinged section adapted to move downwardly between the trackways, a latch member carried by the body portion and adapted to engage the hinged section for securing the hinged section in such position, weighted means for returning the closure to its normal position, and means for moving the door to an open position.

2. In combination with a grain car having an opening and having trackways disposed within the car adjacent to the opening, a closure including a main body portion, and having rollers carried thereby, said rollers operating in the trackways, a hinged upper section forming a part of the closure, an operating means comprising a supporting plate carried by the car, said supporting plate having bearings, a pulley supported in the bearings, means for operating the pulley, flexible means having connection with the pulley, and the closure, whereby movement of the pulley produces a relative movement of the closure, and means for returning the closure to its normal position.

In testimony that I claim the foregoing as my own, I have hereto affixed my signature in the presence of two witnesses.

HENRY KALER.

Witnesses:
 WM. C. F. KULINE,
 O. J. HARDEN.